United States Patent
Lee et al.

(10) Patent No.: US 8,926,267 B2
(45) Date of Patent: Jan. 6, 2015

(54) AMBIENT AIR COOLING ARRANGEMENT HAVING A PRE-SWIRLER FOR GAS TURBINE ENGINE BLADE COOLING

(71) Applicants: Ching-Pang Lee, Cincinnati, OH (US); Kok-Mun Tham, Oviedo, FL (US); Eric Schroeder, Loveland, OH (US); Jamie Meeroff, Cincinnati, OH (US); Samuel R. Miller, Jr., Port St. Lucie, FL (US); John J. Marra, Winter Springs, FL (US)

(72) Inventors: Ching-Pang Lee, Cincinnati, OH (US); Kok-Mun Tham, Oviedo, FL (US); Eric Schroeder, Loveland, OH (US); Jamie Meeroff, Cincinnati, OH (US); Samuel R. Miller, Jr., Port St. Lucie, FL (US); John J. Marra, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 53 days.

(21) Appl. No.: 13/766,909

(22) Filed: Feb. 14, 2013

(65) Prior Publication Data

US 2013/0156579 A1 Jun. 20, 2013

Related U.S. Application Data

(63) Continuation-in-part of application No. 13/084,618, filed on Apr. 12, 2011, now Pat. No. 8,684,666.

(51) Int. Cl.
| | |
|---|---|
| *F01D 25/12* | (2006.01) |
| *F01D 5/14* | (2006.01) |
| *F01D 9/06* | (2006.01) |
| *F02C 7/12* | (2006.01) |
| *F01D 5/18* | (2006.01) |
| *F01D 5/08* | (2006.01) |
| *F01D 11/00* | (2006.01) |

(52) U.S. Cl.
CPC ............ *F01D 5/187* (2013.01); *F01D 5/143* (2013.01); *F05D 2240/127* (2013.01); *F01D 9/065* (2013.01); *F02C 7/12* (2013.01); *F01D 25/12* (2013.01); *F01D 5/082* (2013.01); *F01D 11/001* (2013.01)
USPC ............................ 415/115; 415/116; 415/191

(58) Field of Classification Search
CPC ........... F01D 25/12; F01D 5/081; F01D 9/06; F05D 2260/14; F05D 2260/02; F05D 2260/204
USPC ........................ 415/115, 116, 191; 416/97 R
See application file for complete search history.

(56) References Cited

U.S. PATENT DOCUMENTS

| | | | |
|---|---|---|---|
| 2,735,612 | A | 2/1956 | Hausmann |
| 2,918,254 | A | 12/1959 | Hausammann |
| 4,236,869 | A | 12/1980 | Laurello |
| 4,420,288 | A | 12/1983 | Bischoff |

(Continued)

FOREIGN PATENT DOCUMENTS

EP 2423437 A2 2/2012

*Primary Examiner* — Ninh H Nguyen

(57) ABSTRACT

A gas turbine engine including: an ambient-air cooling circuit (10) having a cooling channel (26) disposed in a turbine blade (22) and in fluid communication with a source (12) of ambient air: and an pre-swirler (18), the pre-swirler having: an inner shroud (38); an outer shroud (56); and a plurality of guide vanes (42), each spanning from the inner shroud to the outer shroud. Circumferentially adjacent guide vanes (46, 48) define respective nozzles (44) there between. Forces created by a rotation of the turbine blade motivate ambient air through the cooling circuit. The pre-swirler is configured to impart swirl to ambient air drawn through the nozzles and to direct the swirled ambient air toward a base of the turbine blade. The end walls (50, 54) of the pre-swirler may be contoured.

18 Claims, 7 Drawing Sheets

(56) References Cited

U.S. PATENT DOCUMENTS

| | | | |
|---|---|---|---|
| 4,677,828 A | 7/1987 | Matthews et al. | |
| 4,759,688 A | 7/1988 | Wright et al. | |
| 4,807,433 A | 2/1989 | Maclin et al. | |
| 5,311,734 A | 5/1994 | Pope et al. | |
| 5,397,215 A | 3/1995 | Spear et al. | |
| 5,466,123 A | 11/1995 | Rose | |
| 5,575,616 A | 11/1996 | Hagle et al. | |
| 6,427,448 B1 * | 8/2002 | Reichert | 60/772 |
| 6,554,569 B2 | 4/2003 | Decker et al. | |
| 6,561,761 B1 | 5/2003 | Decker et al. | |
| 6,669,445 B2 | 12/2003 | Staubach et al. | |
| 6,969,232 B2 | 11/2005 | Zess et al. | |
| 7,220,100 B2 | 5/2007 | Lee et al. | |
| 7,354,243 B2 | 4/2008 | Harvey | |
| 7,465,155 B2 | 12/2008 | Nguyen | |
| 7,503,748 B2 | 3/2009 | Ferra et al. | |
| 7,677,048 B1 | 3/2010 | Brostmeyer et al. | |
| 7,690,890 B2 | 4/2010 | Aotsuka et al. | |
| 7,811,049 B2 | 10/2010 | Xu | |
| 7,874,794 B2 | 1/2011 | Solomon et al. | |
| 7,887,297 B2 | 2/2011 | Allen-Bradley et al. | |
| 8,641,362 B1 * | 2/2014 | Liang | 415/1 |
| 2006/0140768 A1 | 6/2006 | Tam et al. | |
| 2008/0277944 A1 | 11/2008 | Schwarz et al. | |
| 2009/0162193 A1 | 6/2009 | Mariotti et al. | |
| 2010/0000219 A1 * | 1/2010 | Snook et al. | 60/770 |
| 2010/0166549 A1 | 7/2010 | Hatman | |
| 2011/0236200 A1 | 9/2011 | Grover et al. | |
| 2011/0247346 A1 | 10/2011 | Kimmel et al. | |
| 2012/0263575 A1 | 10/2012 | Marra | |

* cited by examiner

AMBIENT AIR COOLING ARRANGEMENT HAVING A PRE-SWIRLER FOR GAS TURBINE ENGINE BLADE COOLING

This application is a continuation-in-part of U.S. application Ser. No. 13/084,618 filed 12 Apr. 2011 which is incorporated by reference herein.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to ambient air induced cooling of turbine blades of a gas turbine engine. In particular, the invention relates to a pre-swirler having a reduced pressure drop in such a system.

BACKGROUND OF THE INVENTION

Gas turbine engine blades used in the engine's turbine section are typically cooled via internal cooling channels through which compressed air is forced. This compressed air is typically drawn from a supply of compressed air created by the engine's compressor. However, drawing of the compressed air for cooling reduces the amount of compressed air available for combustion. This, in turn, lowers engine efficiency. Consequently, minimizing the amount of cooling air withdrawn from the compressor for cooling is an important technology in modern gas turbine design.

In some gas turbine engine models downstream blades extend relatively far in the radial direction. Downstream blades may include, for example, a last row of blades. Cooling channels typically direct cooling air from a base of the blade toward a tip, where it is exhausted into a flow of combustion gases. By virtue of the cooling channel extending within the blade so far radially outward, rotation of the blade, and the cooling channel disposed therein, creates a centrifugal force on the cooling air that urges the cooling air in the cooling channel radially outward. The cooling air exits the blade and this creates a flow of cooling air within the cooling channel. This flow within the cooling channel creates a suction that draws more cooling air from a rotor cavity around the base of the blade into the cooling channel. Consequently, unlike conventional cooling where compressed air is forced through the cooling channels, air that is not compressed, such as ambient air present outside of the gas turbine engine, can be used to cool the downstream blades.

A static pressure of ambient air is sufficiently greater than a static pressure in the rotor cavity to produce a flow of cooling fluid from a source of ambient air toward the rotor cavity. Thus, a static pressure of ambient air may push a supply of ambient air toward the rotor cavity, where a suction generated by the rotation of the blades then draws the ambient air from the rotor cavity through the cooling channels in the turbine blades, thereby completing an ambient air cooling circuit. The suction force aids in drawing ambient air into the rotor cavity. In this manner a flow of ambient air throughout the cooling circuit can be maintained.

However, while the static pressure of the ambient air and the centrifugal force generated are sufficient to generate a flow in the cooling channel, there is a small margin between the pressure differences that are actually present to drive the fluid and minimum static pressure differences necessary to cause the cooling fluid to flow. As a result of this, attention is being paid to ensuring the cooling circuit be designed for maximum air transfer efficiency.

BRIEF DESCRIPTION OF THE DRAWINGS

The invention is explained in the following description in view of the drawings that show.

DETAILED DESCRIPTION OF THE INVENTION

The present inventors have devised a pre-swirler for an ambient-air induced-cooling arrangement for cooling turbine blades in a gas turbine engine, where the pre-swirler has contoured end walls to improve flow characteristics exhibited by a flow of cooling fluid flowing through the pre-swirler. The pre-swirler induces a swirl to a flow of ambient air before the flow is introduced to the rotating turbine blades, thereby providing a more efficient delivery of the flow of cooling fluid to inlets of cooling channels in the blades. The contoured end walls reduce a pressure loss in the flow, thereby increasing efficiency of the flow through the pre-swirler which, in turn, increases an efficiency of the gas turbine engine.

Figure 1:
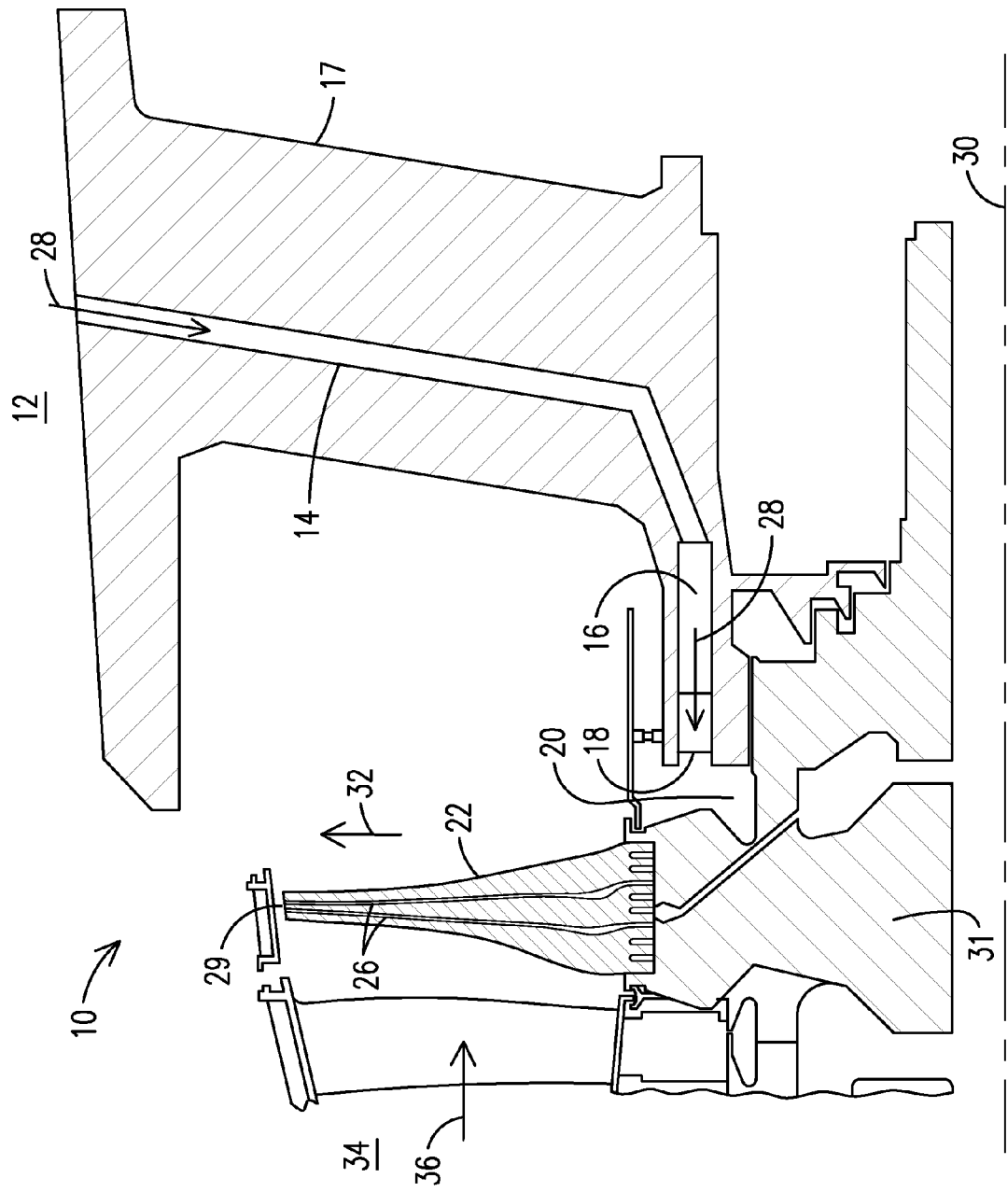
FIG. 1 is a schematic cross section of a side view of a portion of an induced air cooling circuit.

FIG. 1 shows a schematic cross section of a side view of a portion of an exemplary embodiment of an ambient air cooling circuit 10, including: a source 12 of ambient air; at least one air supply passage 14 providing fluid communication between the source 12 and a pre-swirler plenum 16, and optionally being disposed in a strut 17 that supports a pre-swirler 18; a rotor cavity 20 adjacent to turbine blades 22; and a cooling channel inlet (not shown), a cooling channel 26, and a cooling channel outlet 29 in each of the turbine blades 22, which may or may not be disposed at a tip of the turbine blade 22. Once inside the air supply passage 14 the ambient air becomes cooling fluid 28. The cooling fluid 28 travels through the air supply passage 14 where it enters the pre-swirler plenum 16, which is an annular shaped plenum that supplies the cooling fluid 28 to the pre-swirler 18. In the pre-swirler 18 the cooling fluid 28 is swirled about a longitudinal axis 30 of the rotor disc 31. The cooling fluid 28 enters the cooling channel inlets, for example, either directly from the pre-swirler 18 or after the cooling fluid 28 travels through a gap between a rotor disc 31 and base of the turbine blade 22, and then the cooling fluid 28 travels through each cooling channel 26. When in the cooling channels 26, a rotation of the turbine blades 22 about the longitudinal axis 30 of the rotor disc 31, (a.k.a. an axis of rotation), creates a centrifugal force in a radially outward direction 32 that motivates the cooling fluid 28 through the cooling channels 26. The cooling fluid 28 is ejected from the cooling channel outlet 29 and into a hot gas path 34 in which hot gases 36 flow. The movement of the cooling fluid 28 through the cooling channels 26 and out the cooling channel outlet 29 creates a suction force that draws cooling fluid 28 from the rotor cavity 20 into the cooling channel 26 to replace the cooling fluid 28 that has been ejected. A static pressure of ambient air pushes cooling fluid 28 toward the rotor cavity 20 to replace cooling fluid 28 that is drawn into the cooling channels 26, thereby completing the ambient air cooling circuit 10.

Figure 2:
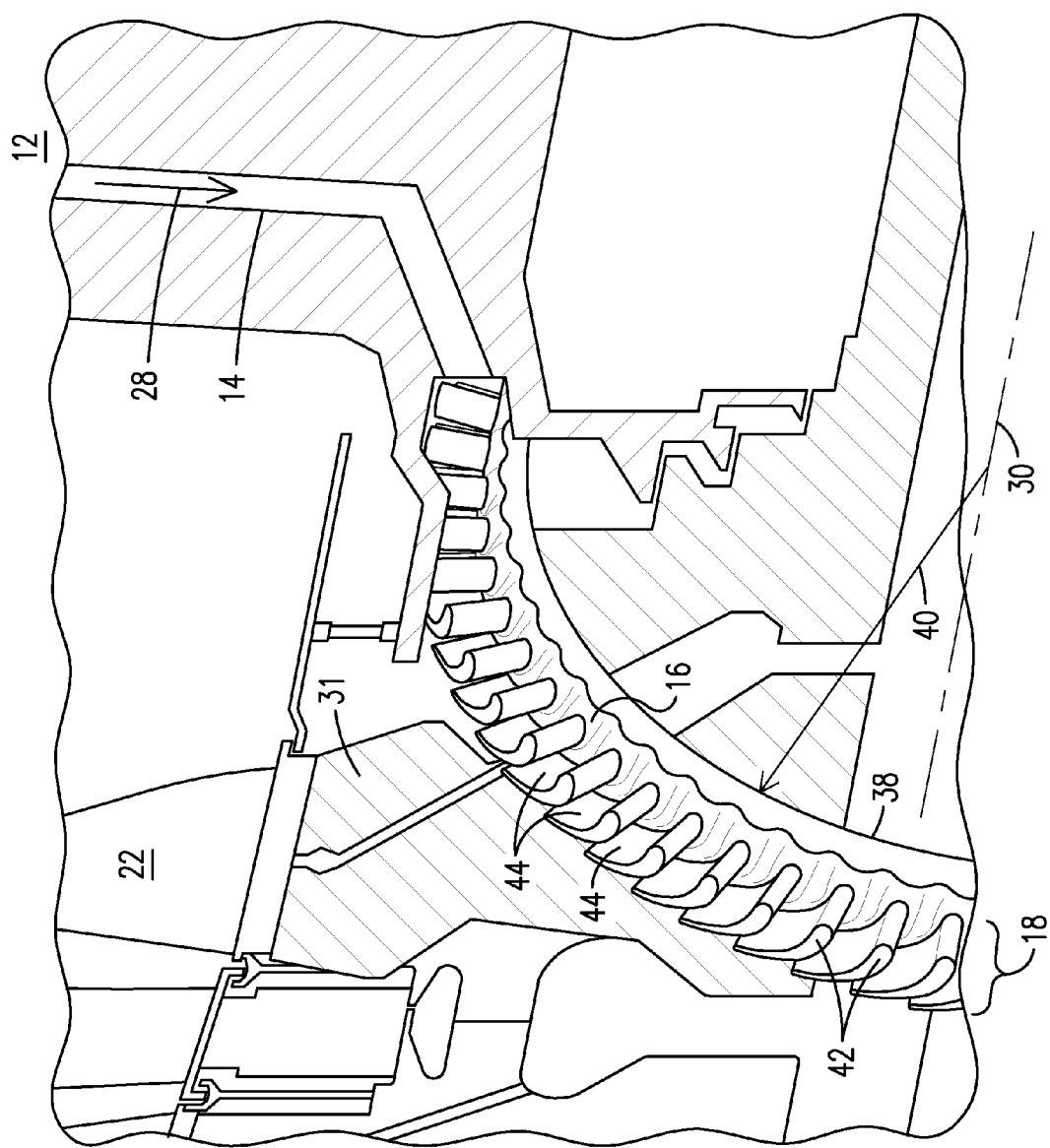
FIG. 2 is a schematic perspective view of a pre-swirler of the induced air cooling circuit of FIG. 1.
Figure 3:
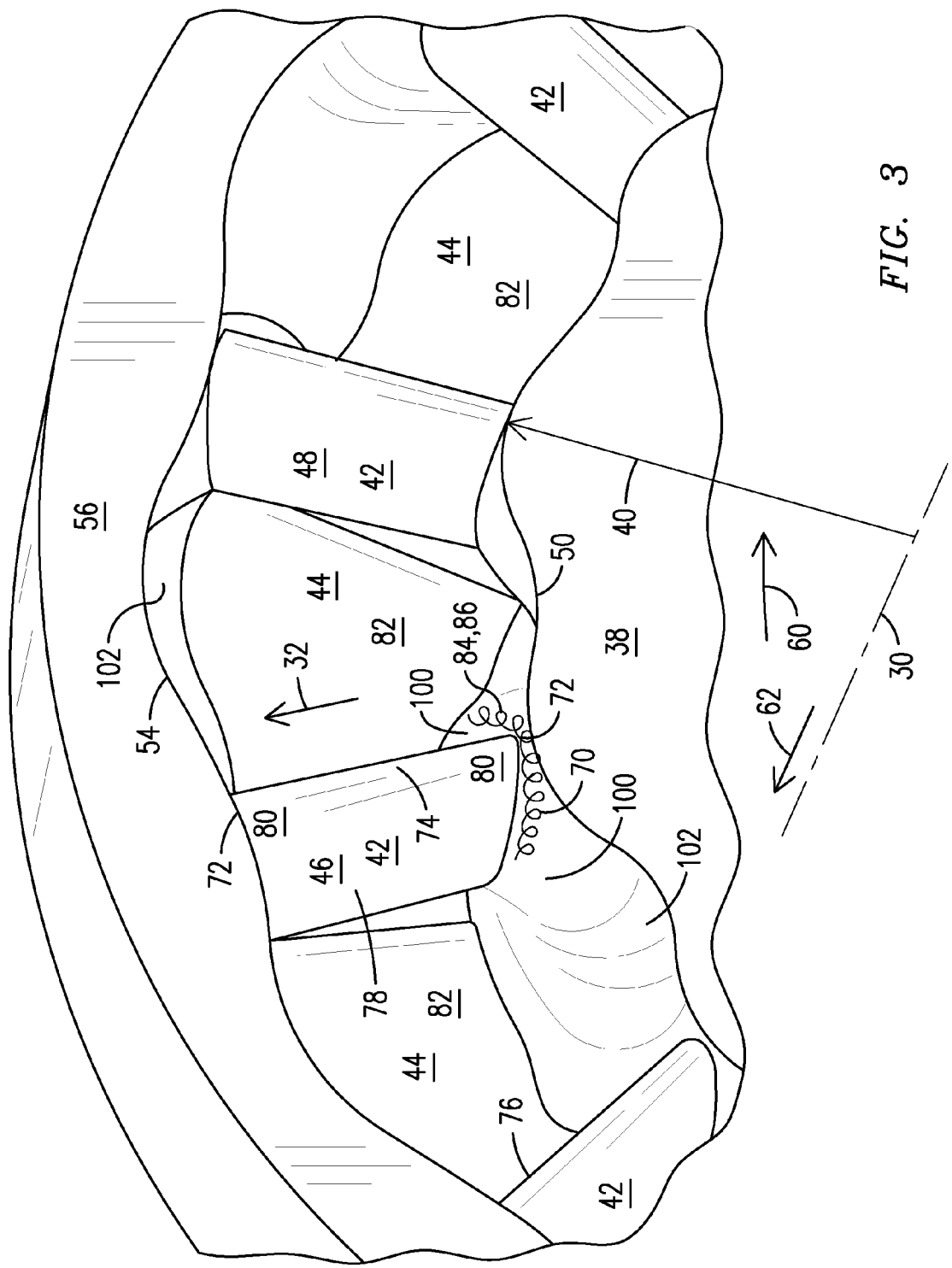
FIG. 3 is a view of an inlet of the pre-swirler of FIG. 2.

FIG. 2 is a schematic perspective view of the pre-swirler 18 of the ambient air cooling circuit 10, from an aft end of the gas turbine engine, with an outer shroud removed. Visible are an inner shroud 38 having a constant diameter 40 and a plurality of guide vanes 42 disposed in an annular array about a longitudinal axis 30 of the rotor disc 31. The pre-swirler 18 receives an axially flowing, annular shaped flow of cooling fluid 28 delivered by the pre-swirler plenum 16 and imparts circumferential motion resulting in a swirl about the longitudinal axis 30 of the rotor disc 31. As can be seen in FIG. 3, which shows an inlet side of an exemplary embodiment of the pre-swirler 18, the plurality of guide vanes 42 define a plurality of nozzles 44 that guide the cooling fluid 28, each nozzle 44 being formed between and defined by a first guide vane 46; a circumferentially adjacent guide vane 48; an outer end wall 50 of an inner shroud 38, and an inner end wall 54 of an outer shroud 56 which the guide vanes 42 span. Each nozzle 44 therefore defines part of the cooling circuit 10. Unlike conventional nozzles, the end walls disclosed herein do not have a constant diameter 40. Instead, the end walls are contoured in both a circumferential direction 60 and an axial direction 62 and may undulate about the constant diameter 40.

One aerodynamic loss associated with guide vanes is known as a horseshoe vortex 70 that may develop at an intersection 72 of a leading edge 74 of the guide vane 42 and an end wall. Within a nozzle 44 these vortices tend to develop in relatively slower regions of a flow of fluid where there is relatively higher static pressure. Cooling fluid near to the end walls and a pressure side 76 and/or a suction side 78 is slowed relative to other regions within the cooling fluid 28 by various aerodynamic factors, including friction associated with these surfaces. As a result, cooling fluid 28 in a region 80 proximate the intersections 72 may be relatively slow moving when compared to a central regions 82 within the nozzle 44. In addition, cooling fluid 28 encountering the leading edge 74 of the guide vane 42 causes a bow wave in front of the leading edge 74 where higher static pressure builds when compared to static pressure within other regions in the flow. Consequently, both relatively slow moving fluid and a relatively high static pressure exist in the region 80 proximate the intersections 72 when compared to the central regions 82 within the nozzle 44. Since the strength of a horseshoe vortex is related to a magnitude of a velocity gradient between the two regions and a magnitude of a static pressure gradient between the two regions, relatively strong horseshoe vortices 70 may develop in a nozzle 44 of the type disclosed herein. The losses associated with horseshoe vortices are magnified when guide vanes have a low aspect ratio. A shorter radial height and a longer length of the airfoil give the horseshoe vortex more opportunity to move closer to the central region 82. Consequently, the benefit of having contoured end walls (50, 54) in an exemplary embodiment of the pre-swirler 18 having low aspect ratio guide vanes 42 is also pronounced.

In addition, cooling fluid 28 in a relatively faster moving region of a flow will tend to draw a leg 84 of the horseshoe vortex 70 toward the relatively faster moving region as the leg 84 flows downstream. In the nozzle 44 of a swirler, since the relatively faster moving region is the central regions 82, the leg 84 of a radially inner horseshoe vortex 86 may be drawn in a radially outward direction 32. Drawing the leg 84 into the central region 82 within the nozzle 44 creates a greater amount of aerodynamic loss in the flow than would occur if the leg 84 were to remain in the region 80 proximate the intersections 72 where the flow rate is lower, and hence aerodynamic losses in the region are less problematic.

Without being held to a particular theory, it is believed that reducing the velocity gradient and/or the static pressure gradient will reduce the strength of the vortex. Consequently, the end walls disclosed herein are effective to reduce the velocity gradient and/or the static pressure gradient, which reduces the strength of the horseshoe vortex 70. In addition, the end wall geometry helps the leg 84 of the horseshoe vortex 70 remain closer to the region 80 proximate the intersections 72, thereby mitigating aerodynamic losses within the central region 82 within the nozzle 44. The contouring includes a hump 100, also seen as a raised area, on each end wall abutting the pressure side 76 of the guide vane 42. The hump 100 disclosed herein is a region where the end wall projects farther into a nozzle when compared to an end wall without a hump 100. The contouring further includes a valley 102, or recessed area, on each end wall between the guide vanes 42. The valley 102 disclosed herein is a region where the end wall recedes from a nozzle when compared to an end wall without a valley 102. Any region of a nozzle end wall without a hump 100 or a valley 102 may be considered a constant diameter region. Each end wall may have a respective constant diameter region, i.e. a region where end wall exists at a constant diameter, or it may only have a theoretical dimension that defines the constant diameter portion of the end wall, while the end wall actually contours radially inward and radially outward of the theoretical dimension. In other words, each end wall may have a hump 100 or valley 102 that occupies only a small portion of the respective end wall, or each end wall may be entirely defined by the hump 100 and valley 102, leaving no actual constant diameter (i.e. neutral) region.

It is believed that the hump 100 work together to cause the cooling fluid 28 in the region 80 proximate the intersections 72 to flow faster than if there were no hump 100 by decreasing a cross sectional area of the nozzle 44 in the region 80 proximate the intersections 72. With less area in which to flow, the cooling fluid 28 must necessarily speed up. It is also believed that the valleys 102 work together to cause the cooling fluid 28 in the central region 82 within the nozzle 44 to slow down due to the increased cross sectional area of the nozzle 44. Increasing the speed of the cooling fluid 28 in the region 80 proximate the intersections 72 and decreasing the speed of the cooling fluid 28 in the central region 82 within the nozzle 44 yields a smaller velocity gradient which, in turn, yields a weaker horseshoe vortex 70.

Without the humps 100, a static pressure in the region 80 proximate the intersections 72 is relatively high due to the slow velocity of the cooling fluid 28. By increasing the velocity in the region 80 proximate the intersections 72, the static pressure decreases. Without valleys 102, a static pressure in the central region 82 within the nozzle 44 is relatively low due to the high velocity of the cooling fluid 28. By decreasing the velocity in the central region 82 within the nozzle 44, the static pressure increases. Decreasing a relatively high static pressure in the region 80 proximate the intersections 72, and increasing the relatively low static pressure in the central region 82 within the nozzle 44 yields a smaller pressure gradient which, in turn, yields a weaker horseshoe vortex 70.

In addition, because the cooling fluid in the central region 82 within the nozzle 44 has been slowed down, there is less of a tendency for the leg 84 of the radially inner horseshoe vortex 86 to be drawn in a radially outward direction 32. As the horseshoe vortex 70 passes over the valley the end wall recedes from the horseshoe vortex 70 in a relative manner, and it is believed this contributes to the horseshoe vortex 70 not being drawn as far into the central region 82 within the nozzle 44. Stated another way, the horseshoe vortex 70 adheres to the end wall better. By better adhering to the end wall, a spread of the aerodynamic losses associated with the horseshoe vortex 70 into the central region 82 within the nozzle 44 is mitigated. This reduces aerodynamic losses overall, which increases engine efficiency.

Figure 4:
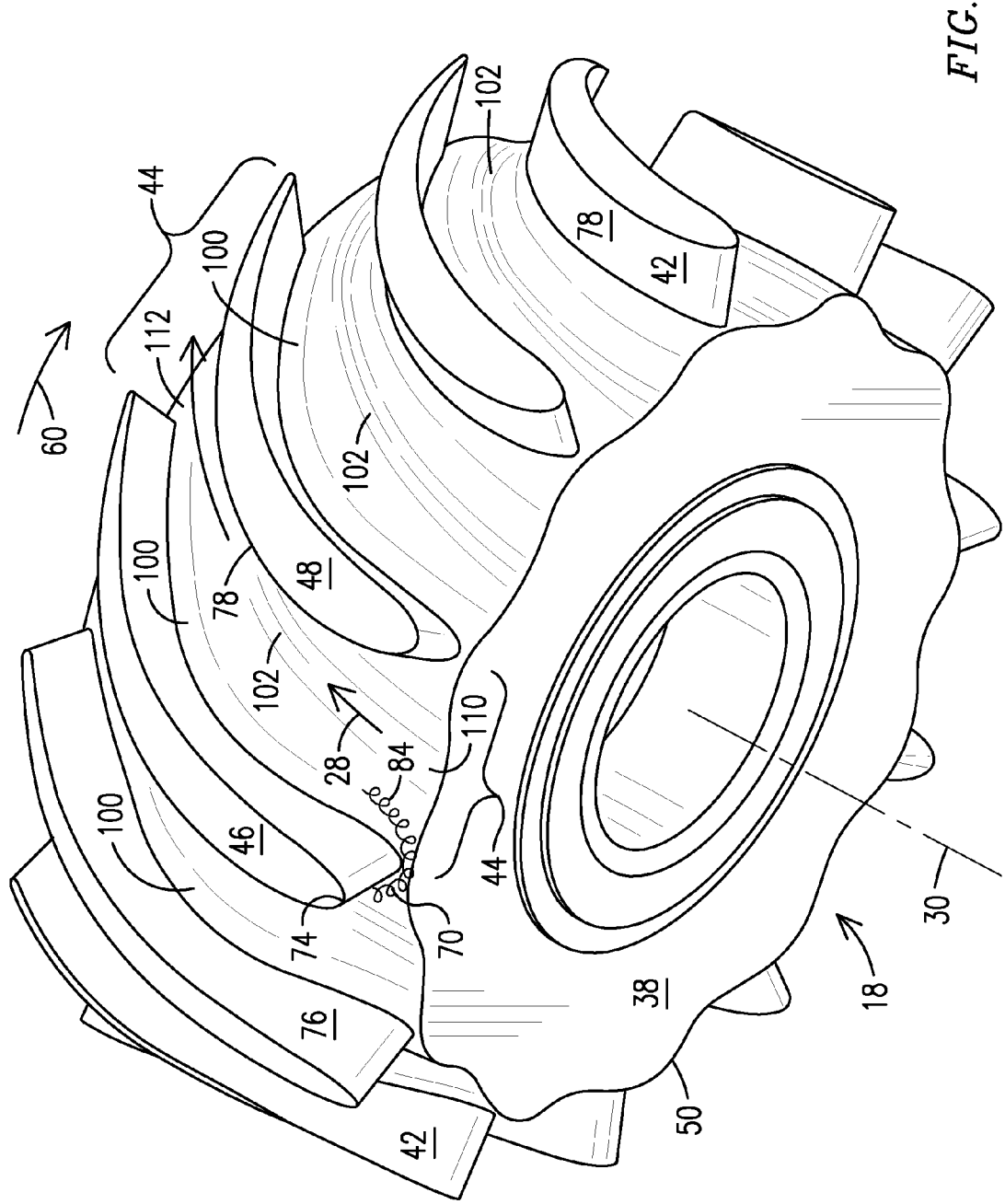
FIG. 4 is a cutaway view of the pre-swirler of FIG. 3, showing a portion of the guide vanes and the inner shroud.

FIG. 4 is a cutaway view of the pre-swirler 18 of FIG. 3, showing a radially inward portion of the guide vanes 42 and the inner shroud 38, with a radially outward portion of the guide vanes 42 and the outer shroud 56 removed. A radially inward portion of a plurality of nozzles 44 is shown, each being defined in part by the outer end wall 50 of the inner shroud 38, a pressure side 76 of a first guide vane 46 and a suction side 78 of the circumferentially adjacent guide vane 48. Cooling fluid 28 enters an inlet end 110 of the nozzle 44 while traveling primarily in an axial direction with respect to the longitudinal axis 30 of the rotor disc 31, and exits from an outlet end 112 traveling in a direction of travel having a component in the axial direction and a component in the circumferential direction 60.

In an exemplary embodiment the inner shroud 38 and/or the outer shroud 56 can be a monolithic body. Vane assemblies used to guide combustion gases in turbines are conventionally made of subcomponents that are assembled into a ring of vanes. Such a configuration is necessary due to factors associated with the larger size of these vane rings, including a high cost to manufacture a single body of this size, thermal growth problems, and assembly and disassembly of the turbine itself which often necessitates disassembling the vane ring. These assembled vane rings often have joints between the subcomponents that change throughout operation. For example, there may be no circumferential gap in the nozzle between adjacent subcomponents, or there may be a circumferential gap. This alone provides for varying aerodynamics. The joint may or may not be radially aligned. For example, one subcomponent may extend radially further out than another. Thus, when gases traveling through a nozzle traverse a gap between adjacent subcomponents, such as when the nozzle has a circumferential component, the gases may encounter a step. It may be a step up or a step down, depending on whether the first subcomponent extends radially farther outward than the adjacent subcomponent, or does not extend radially as far. Both types of steps create vortices in the flow, and these vortices create the same type of aerodynamic losses that the horseshoe vortices 70 do. Due to the smaller size and lower operating temperatures, the inner shroud 38 and the outer shroud 56 do not suffer from the foregoing limitations and therefore they can be manufactured as a single piece component. Having a single piece/monolithic construction allows the nozzles to avoid the aerodynamic losses associated with joints between assembled subcomponents. This, in turn, leads to lower pressure loss resulting from travel through the nozzle 44.

Figure 5:
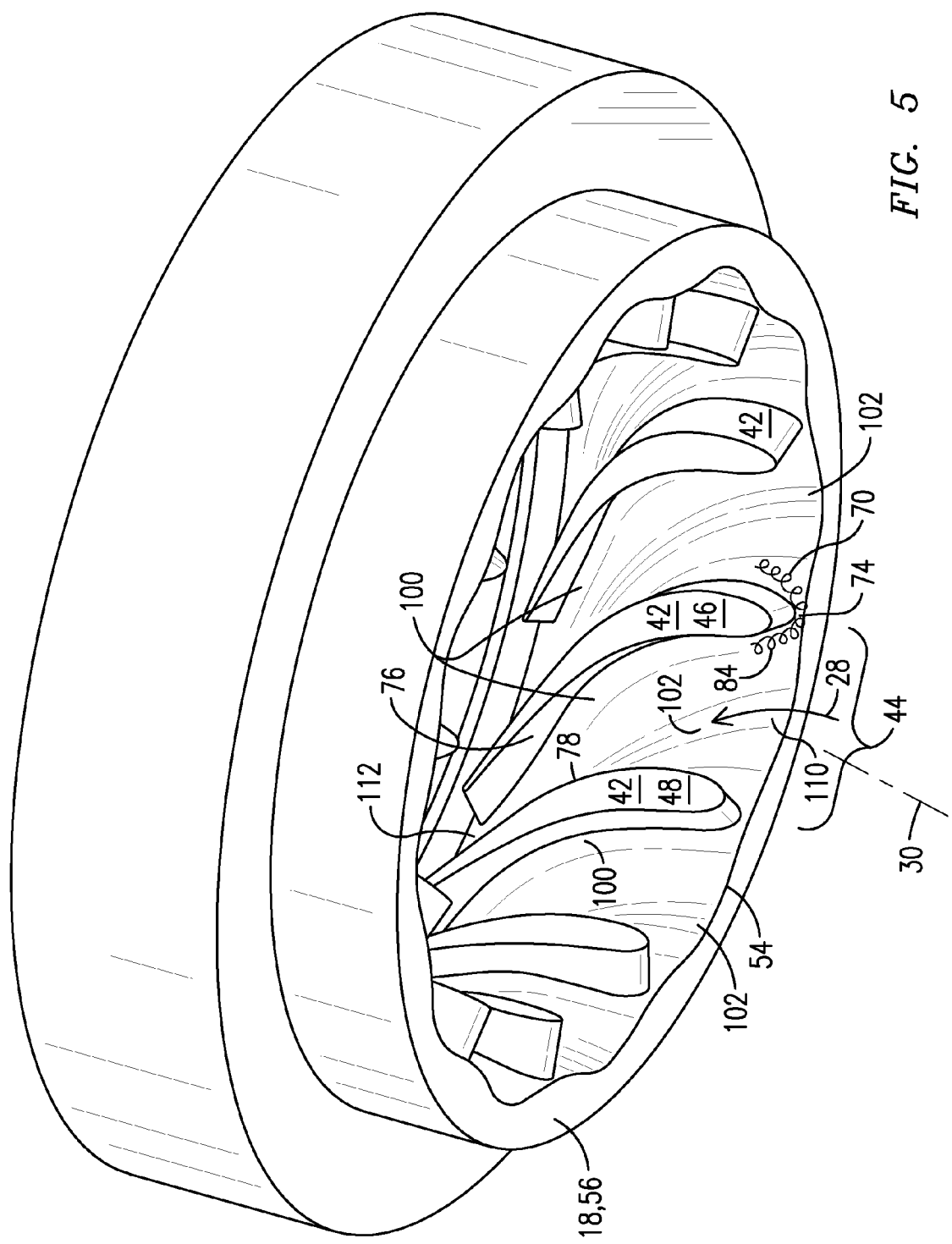
FIG. 5 is a cutaway view of the pre-swirler of FIG. 3, showing a portion of the guide vanes and the outer shroud.

FIG. 5 is a cutaway view of the pre-swirler 18 of FIG. 3, showing a radially outward portion of the guide vanes 42 and the outer shroud 56, with a radially inward portion of the guide vanes 42 and the inner shroud 38 removed. A radially outward portion of a plurality of nozzles 44 is shown, each being defined in part by the inner end wall 54 of an outer shroud 56, a pressure side 76 of a first guide vane 46 and a suction side 78 of the circumferentially adjacent guide vane 48.

Figure 6:
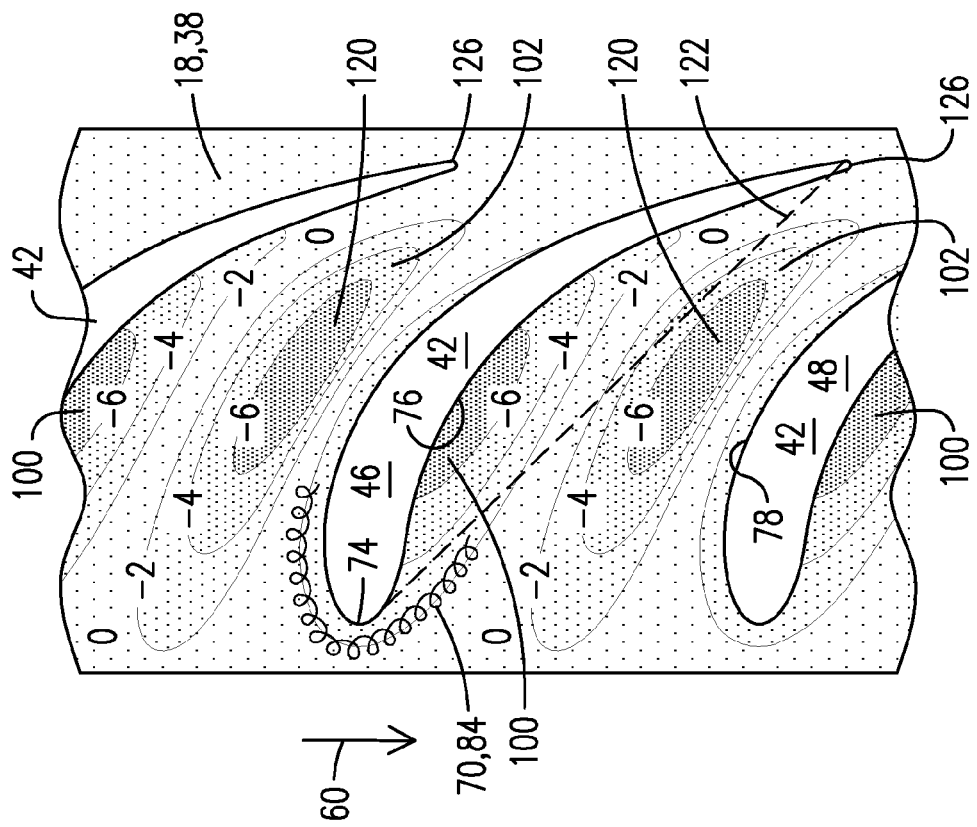
FIG. 6 is a top view showing a topography of the pre-swirler of FIG. 4.

FIG. 6 is a top view showing a topography of an exemplary embodiment of the inner shroud 38 of the pre-swirler 18. In the exemplary embodiment shown the hump 100 is visible adjacent to the pressure side 76 of the first guide vane 46 and a peak of the hump 100 may be disposed approximate one third of the way down a chord line 122 from the leading edge 74 of the first guide vane to a trailing edge 126. In the exemplary embodiment shown the valley 102 is visible in a circumferential direction 60 approximately half way between the first guide vane 46 and the circumferentially adjacent guide vane 48. Horseshoe vortex 70 is visible emanating from the leading edge 74 of the first guide vane 46. In the exemplary embodiment shown a lowest point 120 of the valley is disposed approximately two thirds of the way down the chord line 122 from the leading edge 74 of the first guide vane to the trailing edge 126. It is also located downstream of the leg 84 of the horseshoe vortex 70 such that the leg 84 is forced to travel over (as seen in FIG. 6) the valley 102.

Figure 7:
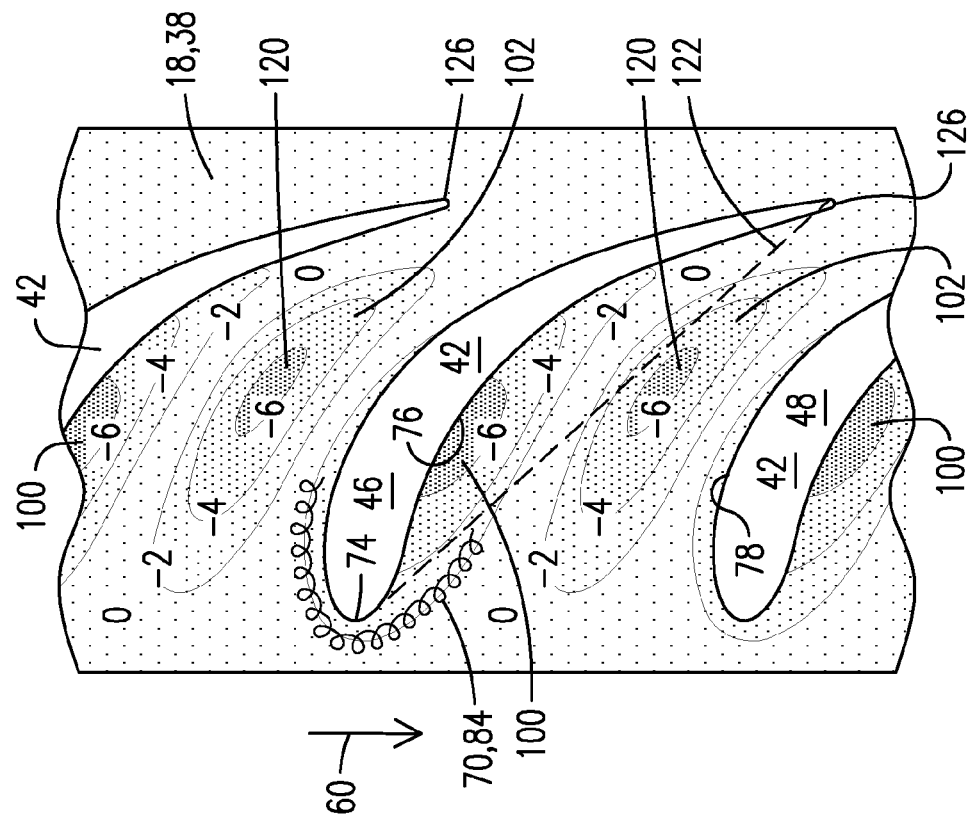
FIG. 7 is a view showing a topography of the pre-swirler of FIG. 5.

FIG. 7 is a view showing a topography of an exemplary embodiment of the outer shroud 56 of the pre-swirler 18, as though looking radially inward at a mirror placed on the hub under the outer shroud 56. Since the outer shroud 56 is radially farther outward it is longer, and therefore there is more space between adjacent guide vanes 42. By eliminating this extra length to match the size of FIG. 6 the hump 100 and valleys 102 appear smaller, but may actually be not smaller. The humps 100 and valleys 102 shown are exemplary. Any contour that produces the desired aerodynamic affects is considered to be within the scope of the disclosure.

Figure 8:
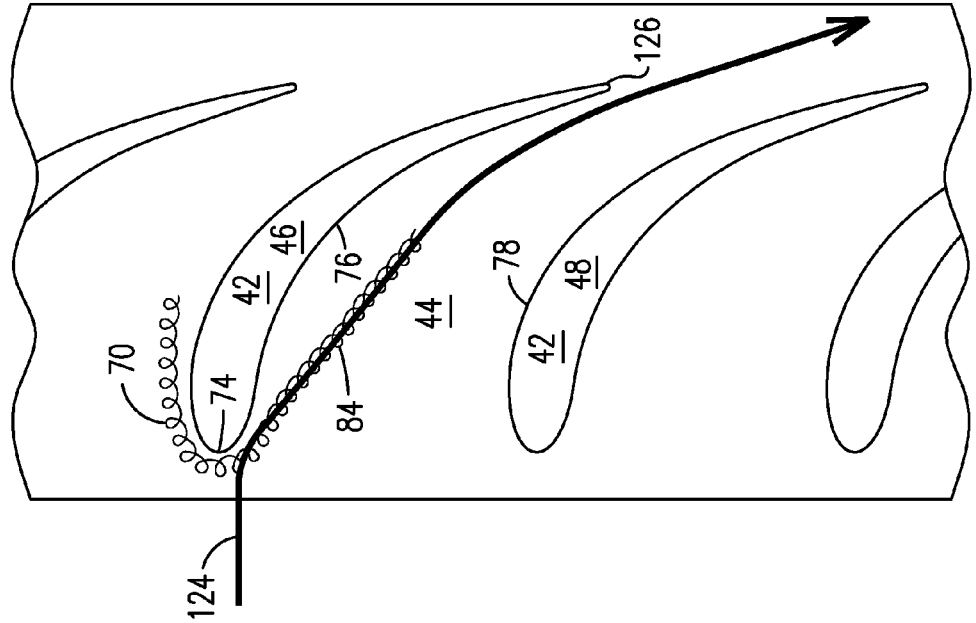
FIG. 8 is an illustration of a streamline of cooling fluid in a pre-swirler without features disclosed herein.

FIG. 8 is an illustration of a streamline of the cooling fluid 28 in a pre-swirler without features disclosed herein using fluid modeling. Streamline 124 represents leg 84 of horseshoe vortex 70. It can be seen that upon encountering the leading edge 74 of the first guide vane 46 leg 84 begins to separate from the pressure side of the first guide vane 46. As it traverses the nozzle 44 the streamline 124 migrates toward the suction side 78 of the circumferentially adjacent guide vane 48 toward the trailing edge 126 of the circumferentially adjacent guide vane 48. While doing this the streamline 124 is also moving upward, out of a plane of the paper, toward the central region 82 within the nozzle 44, and causing aerodynamic losses.

Figure 9:
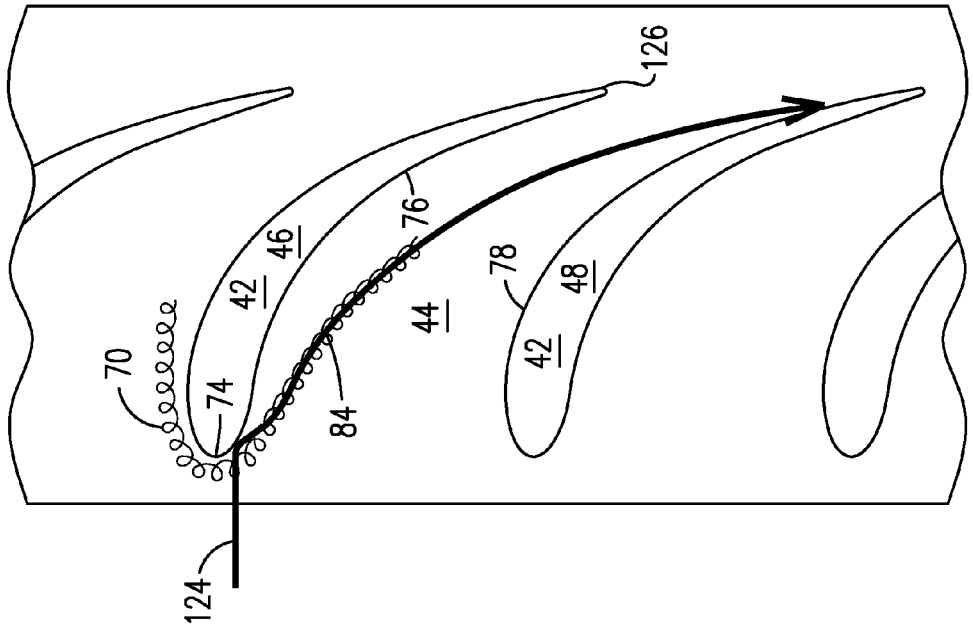
FIG. 9 is an illustration of a streamline of cooling fluid in a pre-swirler having the features disclosed herein.

FIG. 9 is an illustration of a streamline of the cooling fluid 28 in a pre-swirler 18 having the features disclosed herein using fluid modeling. Upon encountering the leading edge 74 of the first guide vane 46 the streamline 124 of the leg 84 of the horseshoe vortex 70 departs slightly from the pressure side 76. In contrast to FIG. 8, the streamline 124 does not migrate toward the suction side 78 of the circumferentially adjacent guide vane 48 as it travels within the nozzle 44 toward the trailing edge 126 of the circumferentially adjacent guide vane 48. Instead, the streamline 124 adheres to the pressure side 76 of the first guide vane 46 for a longer distance. In addition, the streamline 124 is less likely to depart from the plane of the paper to the same degree. As a result, in a pre-swirler disclosed herein, the leg 84 of the horseshoe vortex 70 generates less aerodynamic loss, yielding more efficient operation of the gas turbine engine.

From the foregoing it is apparent that the inventors have recognized a new way of improving aerodynamics in an ambient air induced cooling arrangement for a turbine blade, including using a pre-swirler. The inventors have also made further improvements to the pre-swirler to further improve aerodynamics within the pre-swirler. Thus, the foregoing represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine, comprising:
   an ambient-air cooling circuit comprising a cooling channel disposed in a turbine blade and in fluid communication with a source of ambient air that provides cooling fluid: and
   a pre-swirler, comprising:
      an inner shroud;
      an outer shroud; and
      a plurality of guide vanes, each spanning from the inner shroud to the outer shroud,
      wherein circumferentially adjacent guide vanes define respective nozzles there between, the nozzles defining a portion of the cooling circuit, each nozzle defined by a pressure side of a first guide vane, a suction side of the adjacent guide vane, an outer end wall defined by the outer shroud, and an inner end wall defined by the inner shroud;
      wherein forces created by a rotation of the turbine blade motivate the cooling fluid through the cooling circuit; and
      wherein the pre-swirler is configured to impart swirl to the cooling fluid drawn through the nozzles and to direct the swirled cooling fluid toward a base of the turbine blade.

2. The gas turbine engine of claim 1, wherein the inner shroud is formed as a monolithic body.

3. The gas turbine engine of claim 1, wherein the outer shroud is formed as a monolithic body.

4. The gas turbine engine of claim 1, wherein the inner end wall and outer end wall each comprise a valley disposed between the adjacent guide vanes.

5. The gas turbine engine of claim 4, wherein the valley is disposed downstream with respect to a vortex formed in the drawn cooling fluid by a leading edge of the first guide vane during the rotation of the turbine blades.

6. The gas turbine engine of claim 1, wherein the inner end wall and outer end wall each comprise a hump abutting the pressure side of the first guide vane.

7. The gas turbine engine of claim 6, wherein a peak of the hump is disposed at approximately one third of a length of a chord line of the first guide vane from a leading edge of the first guide vane.

8. The gas turbine engine of claim 1, the cooling circuit further comprising an air supply passage configured to supply the cooling fluid from the source of the ambient air to the pre-swirler.

9. The gas turbine engine of claim 8, further comprising a strut that supports the pre-swirler in which the air supply passage is disposed.

10. A gas turbine engine, comprising:
    an ambient-air cooling circuit comprising a cooling channel disposed in a turbine blade and in fluid communication with a source of ambient air that provides cooling fluid, wherein forces created by a rotation of the turbine blade motivate the cooling fluid through the cooling circuit, the improvement comprising:
    a pre-swirler, comprising: an inner shroud formed as a monolithic; an outer shroud formed as a monolith; and a plurality of guide vanes disposed in an annular array there between, the pre-swirler defining a plurality of nozzles defining part of the cooling circuit, each nozzle comprising: an outer end wall defined by the outer shroud between adjacent guide vanes; an inner end wall defined by the inner shroud between the adjacent guide vanes; and a pressure side and a suction side of the adjacent guide vanes,
    wherein the pre-swirler is configured to impart circumferential motion about a longitudinal axis of a rotor disc to the cooling fluid drawn through the nozzles and to direct the swirled cooling fluid toward a base of the turbine blade.

11. The gas turbine engine of claim 10, wherein the inner end wall and the outer end wall of each nozzle comprises a respective valley.

12. The gas turbine engine of claim 10, wherein the inner end wall and the outer end wall of each nozzle comprises a respective hump abutting the pressure side of a respective guide vane.

13. The gas turbine engine of claim 10, the cooling circuit further comprising an air supply passage configured to supply the cooling fluid from the source of the ambient air to the pre-swirler, wherein the air supply passage is disposed within a strut that supports the pre-swirler.

14. A gas turbine engine, comprising:
    an ambient-air cooling circuit comprising a cooling channel disposed in a turbine blade and in fluid communication with a source of ambient air that supplies cooling fluid: and
    a pre-swirler, comprising:
       an inner shroud;
       an outer shroud; and
       a plurality of guide vanes disposed between the inner shroud and the outer shroud;
       wherein the inner shroud, the outer shroud, and the plurality of guide vanes define an annular array of nozzles defining part of the ambient-air cooling circuit, each nozzle bounded by two adjacent guide vanes, an inner end wall of the outer shroud, and an outer end wall of the inner shroud;
       wherein the nozzles are configured to direct the cooling fluid traveling there through towards a plurality of cooling fluid inlets present in bases of adjacently disposed rotating blades, and
       wherein the nozzles impart circumferential motion to the cooling fluid flowing there through about an axis of rotation about which the rotating blades rotate.

15. The gas turbine engine of claim 14, wherein the inner shroud and the outer shroud are each formed as respective monolithic bodies.

16. The gas turbine engine of claim 14, wherein the inner end wall of the outer shroud and the outer end wall of the inner shroud of each nozzle comprises a respective valley.

17. The gas turbine engine of claim 14, wherein the inner end wall of the outer shroud and the outer end wall of the inner shroud of each nozzle comprises a respective hump abutting a pressure side of a respective guide vane.

18. The gas turbine engine of claim 14, the cooling circuit further comprising an air supply passage configured to supply the ambient air from the source of the ambient air to the pre-swirler, wherein the air supply passage is disposed within a strut that supports the pre-swirler.

* * * * *